United States Patent [19]
Doyel

[11] 3,985,347
[45] Oct. 12, 1976

[54] ICE CREAM MACHINE

[76] Inventor: John S. Doyel, 404 W. 20th St., New York, N.Y. 10011

[22] Filed: July 26, 1974

[21] Appl. No.: 492,178

[52] U.S. Cl. .............................................. 259/108
[51] Int. Cl.² .......................................... B01F 7/18
[58] Field of Search...... 259/108, DIG. 32, DIG. 33, 259/DIG. 34, 78, 102, 103, 147

[56] References Cited
UNITED STATES PATENTS

| | | | |
|---|---|---|---|
| 1,018,505 | 2/1912 | Kronenberger | 259/DIG. 34 |
| 1,997,035 | 4/1935 | Arbuckle | 259/DIG. 34 |
| 2,541,814 | 2/1951 | Gaddini | 259/DIG. 34 |
| 3,170,676 | 2/1965 | Koch | 259/DIG. 32 |
| 3,656,974 | 4/1972 | Mihalyi | 259/108 |

Primary Examiner—Stanley N. Gilreath
Assistant Examiner—Donald B. Massenberg
Attorney, Agent, or Firm—Cooper, Dunham, Clark, Griffin & Moran

[57] ABSTRACT

An ice cream machine includes a dasher positioned in a receptacle to stir the ingredients. A fixed, non-rotatable post is also positioned in the receptacle in cooperating relationship within the dasher. The dasher is spaced from the wall and bottom of the receptacle and is of a novel configuration. The dasher is rotated at a low speed by a power unit contained entirely within the machine. Ice cream is made using the machine within the freezer compartment of a refrigerator.

11 Claims, 10 Drawing Figures

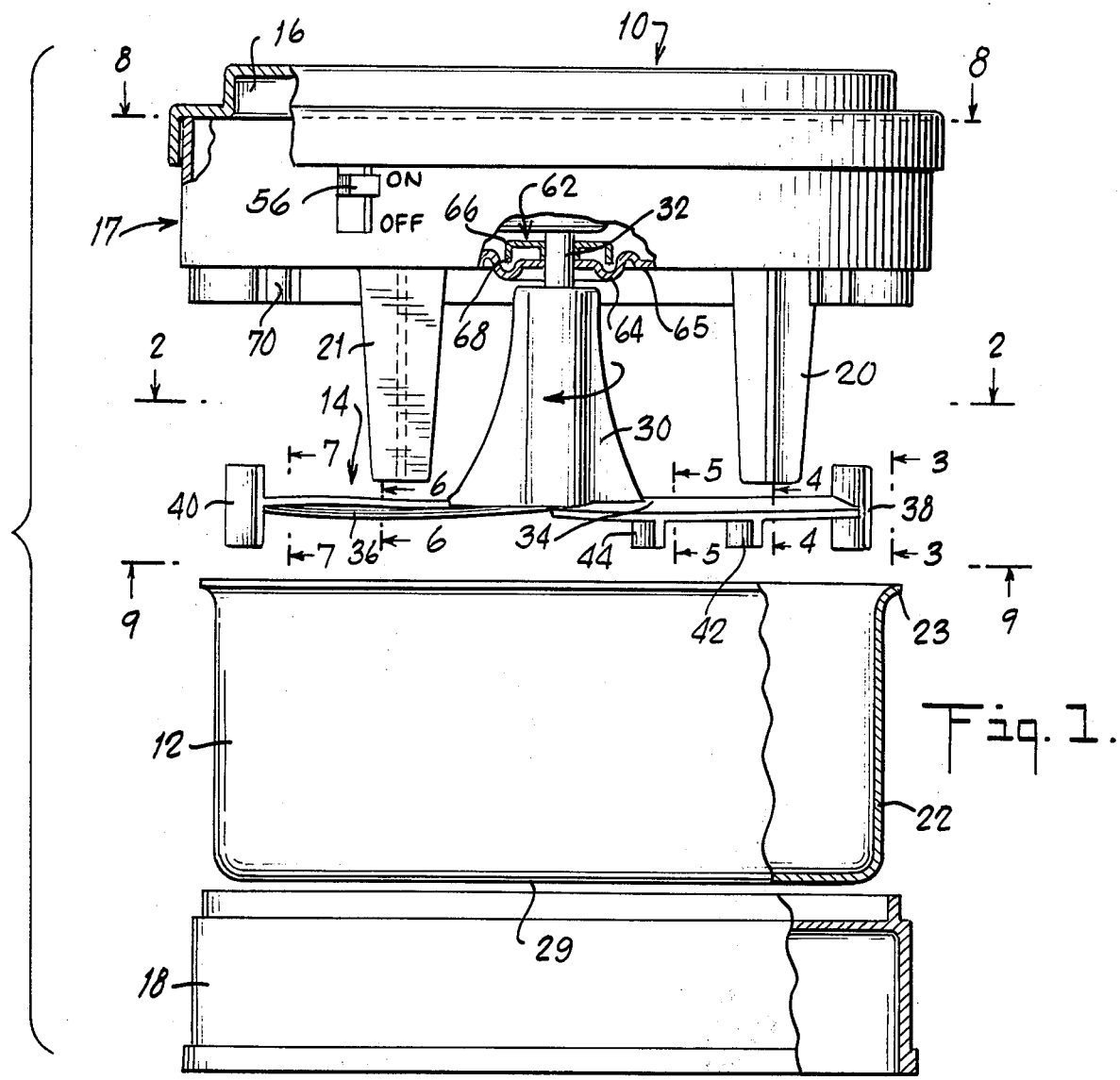
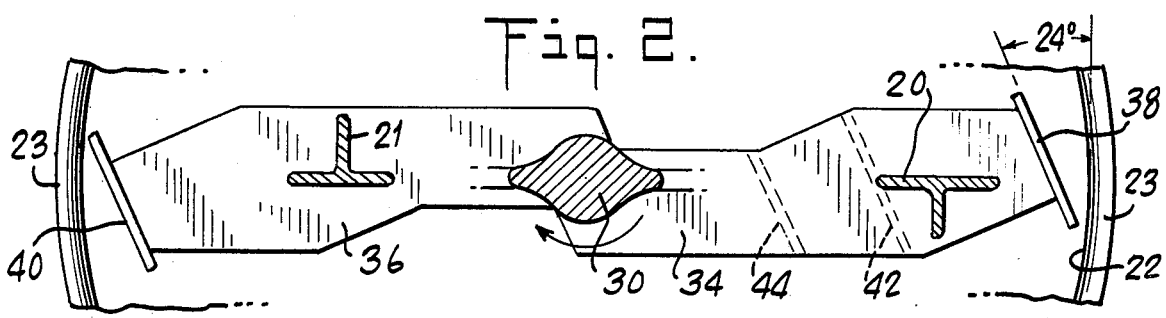
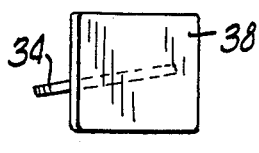 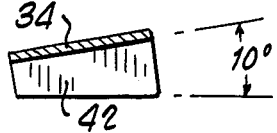 

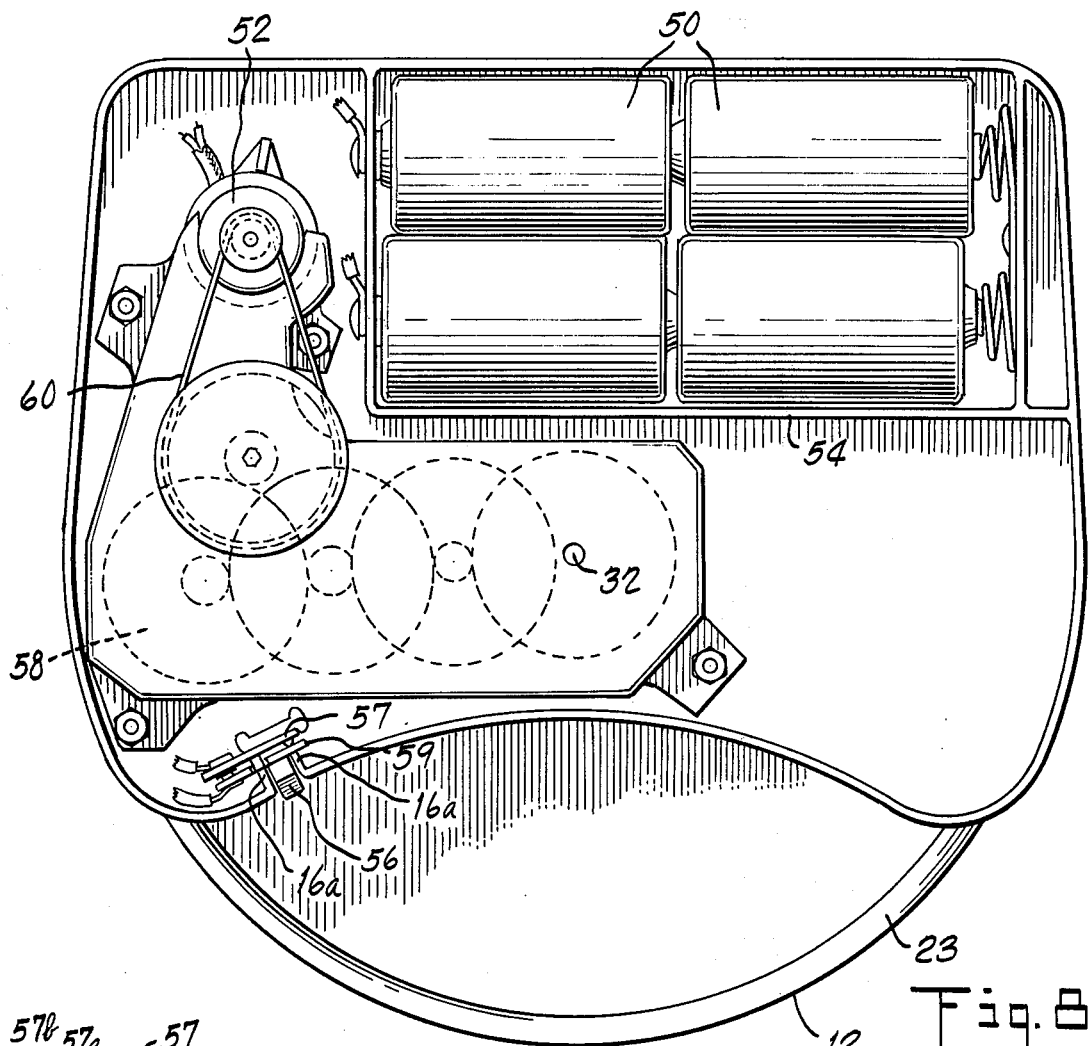

ICE CREAM MACHINE

BACKGROUND OF THE INVENTION

The present invention relates to an ice cream machine, and to a dasher for use in an ice cream machine. The invention additionally relates to a method of making ice cream using the machine within the freezer compartment of a refrigerator.

Devices for making ice cream in the freezer compartment of a refrigerator are known. In one such apparatus, the ingredients for making ice cream are chilled for at least 2 hours and then placed in a receptacle in the freezer of a refrigerator. A power unit, which must be connected to an external power supply by means of an electric cord extending through the freezer door, is placed over the receptacle, and a dasher is positioned in the receptacle for stirring the mixture. The dasher is rotated by the power unit, and contacts the bottom and walls of the receptacle to scrape them clean of the frozen mixture. Accordingly, the power unit for rotating the dasher must be of relatively high capacity to drive the dasher as the mixture freezes. When the ice cream has sufficiently frozen, the dasher slows down and the power unit is eventually shut off. See for example U.S. Pat. No. 2,962,267, wherein a high speed agitator is additionally employed.

In another ice cream machine, the receptacle is toroidal in shape and a power unit is located within the central aperture. The drive shaft of the power unit extends upwardly to a cross arm. At each end of the crossarm, a paddle extends downwardly into the ingredients to be mixed. Again, the device is placed inside the freezer of a refrigerator and an electric cord must pass through the freezer door to be plugged into the nearest electrical outlet. The paddles are rotated in the unfrozen mixture until the mix has attained the proper consistency, usually about sixty minutes, and the paddles then are lifted automatically from the mixture. The mixture is left in the freezer compartment for an additional 1 to 2 hours to obtain the desired hardness.

The main deficiency of each of these machines is that they must be plugged into an external power supply by an electric cord which must pass through the freezer door. The cord is liable to be damaged by the door as it is opened and closed. If the cord is improperly positioned, the door may be left ajar and the other freezer contents will become unfrozen. Some potential consumers are reluctant to place a machine in their refrigerator wherein the cord extends through the door out of fear of an electric shock. A further problem is that as the dasher is rotated at a relatively high speed in order to agitate the mixture, and since the dasher scrapes the frozen mixture from the wall and bottom of the receptacle, it is necessary to use a high power electric motor to drive the dasher, particularly as the mixture begins to freeze. It is impractical to supply current to such high power electric motor from a battery.

SUMMARY OF THE INVENTION

An object of the present invention is to provide an ice cream machine which is simple in design and is operated in the freezer compartment of a refrigerator.

Another object of the present invention is to provide an ice cream machine in which the power supply is contained entirely within the machine and no external power source is required.

A further object of the invention is to provide a reliable ice cream machine for making high quality ice cream in a short period of time using a low voltage power supply.

The objects of the invention are met by an ice cream machine comprising a receptacle for the ingredients, a dasher positionable in the receptacle and spaced from the wall and bottom thereof, a fixed non-rotatable post positionable in the receptacle in cooperating relationship with the dasher, and a power unit contained entirely within the machine, for supporting the dasher and post and for rotating the dasher.

Because the dasher is spaced from the wall and bottom of the receptacle, no high friction created by the dasher encountering the hard frozen material along the wall and bottom. Additionally, the dasher is rotated at a relatively low speed, for example less than 5 r.p.m., so that little power is needed to drive it. Moreover, the dasher blade is disposed at an acute angle to the receptacle bottom and at an acute angle to the wall so that the dasher causes the mixture to undulate slowly upwardly and circumferentially, and around the fixed post. This type motion needs substantially less power than required in prior art devices wherein the mixture is agitated at a greater speed. It is possible to make ice cream by stirring the mixture for less than about 30 minutes, thereby also requiring less power. Thus, an internal power supply, such as, for example, four D cells of the type ordinarily used in flashlights, may be used to drive the dasher.

The dasher used in the present ice cream machine is of a novel configuration. It comprises a shaft connected to the power unit drive, at least one blade extending transversely of and outwardly from the shaft, an upstanding flange at the radially outer end of the blade, and at least one lug extending transversely of and downwardly from the blade between the shaft and the flange. The lug and the flange are dimensioned and arranged to form concentric annuli during rotation of the dasher.

In one method of making ice cream using the machine, the ingredients are mixed and then cooled for up to about 2 hours at the temperature in the freezer compartment of a refrigerator. The cooling is preferably done in the receptacle, which is preferably of metal, such as aluminum, for good heat conductivity. Then, the dasher stirs the mixture in the receptacle, which by that time has the consistency of slush, at a speed of less than about 5 r.p.m. such that the mixture undulates slowly upwardly and circumferentially, and around the fixed post, for a period of about 30 minutes. The power unit is removed and the mixture is frozen at the freezer compartment temperature until it has reached the desired hardness, a period of up to about 3 hours.

BRIEF DESCRIPTION OF THE DRAWINGS

FIG. 1 is an exploded elevational view, partly in section, showing an ice cream machine in accordance with the present invention.

FIG. 2 is a sectional view showing the dasher and taken along line 2—2 of FIG. 1.

FIGS. 3 through 7 are sectional views of the dasher taken along lines 3—3 through 7—7 respectively of FIG. 1.

FIG. 8 is a sectional view of the power unit taken along line 8—8 of FIG. 1.

FIG. 8a is an exploded perspective view of an electrical switch used in the invented ice cream machine.

DETAILED DESCRIPTION

Figure 9:
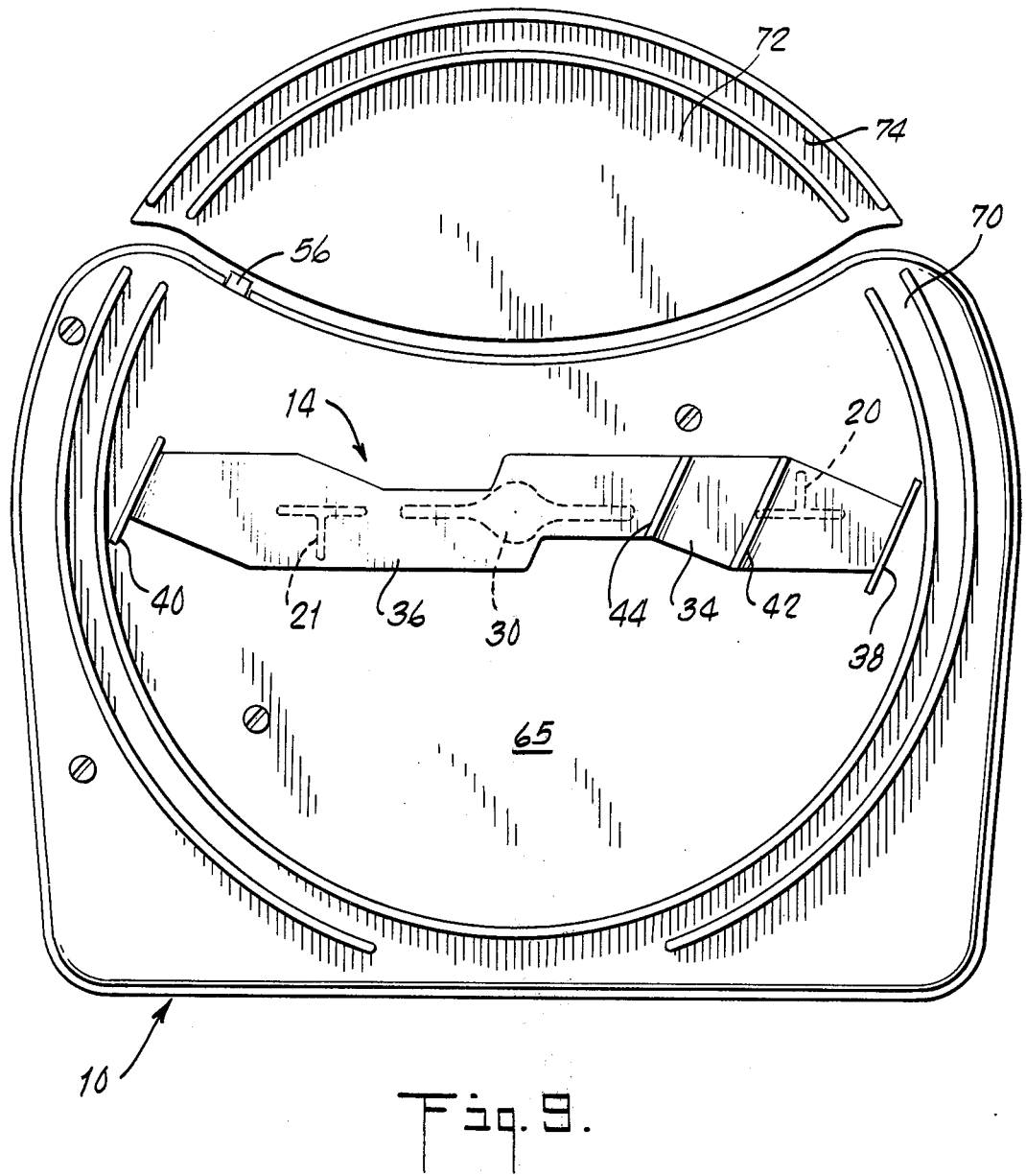
FIG. 9 is a sectional view of the dasher taken along line 9—9 of FIG. 1.

Referring to FIG. 1 of the drawing, there is shown an ice cream machine 10 in accordance with the present invention. The machine 10 includes an open mouth receptacle or pan 12 adapted to receive ingredients for making an ice cream mixture. It also includes a dasher 14 positionable in the receptacle for stirring the mixture. A housing 16 contains a power unit 17 for rotating the dasher. A base 18 is adapted to receive and support the receptacle 12, and to additionally serve as a cover for the receptacle after the ice cream has been made and for an ice cream dish. A pair of fixed posts 20, 21 are supported by the housing 16 and depend into the receptacle in cooperating relationship with the dasher 14. The pan 12 is preferably made of a heat-conducting material, such as aluminum. The other parts of the machine are preferably fabricated of food-grade acrylonitrile-butadiene-styrene thermo plastic material.

A particular feature of the present invention is that the dasher 14 rotates at a relatively low speed, and is spaced from the bottom 29 and side wall 22 of the receptacle 12. In a specific embodiment, the speed of rotation is less than about 5 r.p.m., and preferably about 3 r.p.m. The dasher is spaced from 1/16 to 1/8 inch from the wall 22 and the bottom 20. This spacing and low speed operation permit the dasher to be rotated by a power source of relatively low rating, which is disposed entirely internally of the machine. The machine need not be connected to an external power supply.

The design of the dasher 14 also contributes to the power savings. Generally, the dasher 14 comprises a shaft 30 connected to the drive shaft 32 of the power unit 17, and at least one blade 34 extending transversely of and outwardly from the lower end of the shaft 30. Preferably, two blades 34, 36 extend outwardly from the shaft 30 and are coaxial, although only one blade is essential. The blades stir the mixture in the receptacle. Each blade is disposed at an acute angle to the bottom 20 of the receptacle. Preferably, this acute angle is about 10°. The angled blades cause the mixture to move vertically upon rotation of the dasher 14. Preferably also, blade 34 is disposed at an opposing acute angle to blade 36, so that the dasher blades move the mixture in the same direction. (Compare FIGS. 4 and 6.) The lower edges of the blades are spaced from the receptacle bottom 20 a distance of about 1/16 to 1/8 inch.

The blades 34, 36 terminate respectively in upstanding flanges or pads 38, 40 at their outer ends which are useful in stirring the mixture. As shown in FIG. 2, each of the flanges 38, 40 is disposed at an acute angle to the receptacle wall 22. Preferably, this acute angle is about 24°. Also, the outermost edges of the flanges are spaced from the receptacle wall a distance of about 1/16 to 1/8 inch. The lower edge of each flange is substantially parallel to the receptacle bottom 20. See FIGS. 3 and 7. This design prevents the flanges from scraping the wall 22 as they rotate, and thereby from scraping the hard frozen mixture from the wall. It also avoids wedging of solid additives, such as nuts or fruit, between the flanges and the wall. Thus, a power source of lower rating is usable to rotate the dasher.

On one of the blades 34 or 36 is disposed at least one lug 42. Preferably, two lugs 42, 44 extend transversely of and downwardly from the blade 34 between the shaft 30 and the flange 38. The lugs need be located on only one of the blades, as they mix the ingredients throughout the pan by pushing the ingredients horizontally upon rotation of the dasher 14. Each of the lugs 42, 44 is disposed parallel to the flanges 38, 40 and at an acute angle to the receptacle wall 22 of about 24° (FIG. 2). As the flange 38 and the lugs 42, 44 are spaced along the blade 34 and are disposed at the same angle to the receptacle wall, they form concentric annuli during rotation of the dasher. Thus, the three elements 38, 42, 44 together with the flange 40 stir the mixture throughout substantially the entire pan 12 so that the mixture slowly undulates upwardly and circumferentially. The bottom edge of each lug 42, 44 is parallel to the pan bottom 20. However, as the lugs depend from the angled blade 34, the top edge of each lug is disposed at an angle of 10° to the pan bottom (as shown in FIGS. 4 and 5). The lower edges of the flanges 38 and 40 and the lugs 42 and 44 lie in a horizontal plane and are spaced a distance of about 1/16 to 1/8 inch from the bottom. This design prevents the lugs and flanges from scraping against hard frozen mixture stuck to the pan bottom and thus permits the use of a lower-rated power source to rotate the dasher.

The posts 20, 21 depend from the housing 16, in cooperating relationship with the dasher 14, and assist to properly stir the ice cream mixture. The posts 20, 21 serve to break up lumps in the ingredients. As shown in FIGS. 1 and 2, the posts 20 and 21 are generally T-shaped in cross-section, although they may be of any other suitable shape. The flat side of the T faces the direction of movement of the ice cream stirred by the dasher 14, as shown by the arrow. Preferably, the posts 20, 21 are spaced at different distances from the shaft 30. The posts extend substantially parallel to the shaft 30 and terminate at their lower ends at a plane spaced from the upper surfaces of the dasher blades 34, 36 so that they do not interfere with the dasher's rotation.

The housing 16 which contains the power unit 17 for the machine is best seen in FIG. 8. Any suitable power source may be used if it can be contained entirely internally of the machine. Preferably, the power source is a plurality of common D cells 50 connected in series by a suitable simple electrical circuit (not shown) to a DC motor 52. There is no external power source. The cells 50 are located entirely within a container 54, which is sealed along its sides so that in the event the cells should fail, such as by leakage, the residue will remain within the container 54 and will not leak into the ice cream mixture. The electrical circuit is completed by a manual switch 56 located on the exterior of the housing 15.

Referring to FIGS. 8 and 8a, the switch 56 comprises a stationary plate 57 and a sliding plate 59. The stationary plate 57 is suitably affixed to the housing 16, and a metal eyelet 57a secures to the plate 57 an electrical wire 57b which is a part of the battery-motor circuit. The sliding plate 59 has a similar eyelet 59a securing a similar electrical wire 59b. When the sliding plate 59 is manually moved down with respect to the stationary plate 57, to an off position, the eyelet 59a is below the eyelet 57a and out of physical and electrical contact with the eyelet 57a, thus breaking the circuit between the batteries 50 and the motor 52 and turning off the motor. When the sliding plate 59 is manually moved up from the off position, the eyelets 59a and 57a make physical and electrical contact, to thereby turn on the motor 52. A projection 57c from the plate 57 keeps the eyelet 59a spaced from the plate 57 when the plate 59 is in its off position, to prevent binding of the eyelet 59a against the eyelet 57a as the plate 59 is moved up. The plate 59 is biased against the plate 57 by suitable projections 16a of the housing 16. Note that the eyelets 57a, 59a serve the dual function of switch contacts and of means for attaching the wires 57b, 59b to the switch plates 57, 59, and that the facing surfaces of the eyelets 57a, 59a clean each other by sliding friction each time the switch 56 is operated to thereby maintain said electrical contact.

The shaft of the motor 52 rotates at about 10,000 r.p.m. and drives a series of gears 58, comprising a reduction gear train, through a belt 60. Preferably, the belt 60 is a simple elastic rubber band of the type solid in office supply stores, but can be any other suitable belt, such as any suitable O-ring made of a rubber-like material. Since the belt 60 stretches easily, it snaps off its pulleys if the motor 52 is left on when the mixture becomes too thick and too difficult to stir. The dasher 14 then ceases rotating and the motor's shaft spins harmlessly. Additionally, when the motor 52 is first started, the belt 60 both slips and stretches, and acts thereby as a clutch. The gears 58 greatly reduce the speed and drive the shaft 32, to which the dasher shaft 30 is connected, at a rate which is preferably less than 5 r.p.m.

A grease trap 62 is provided to prevent any lubricant that may be used, for example, for the gears 58, from traveling down the drive shaft 32, onto the dasher 14 and thence into the ice cream mixture. As shown in FIG. 1, the grease trap 62 comprises a groove 64 formed in the bottom panel 65 of the housing 16 surrounding the aperture through which the drive shaft 32 protrudes. A bearing 66 surrounds the drive shaft 32 and a downturned flange 68 at its outer edge extends into the groove 64. The bearing 66 directs any lubricant into the groove 64 and away from the drive shaft 32.

A groove 70 is formed in the bottom panel 65 of the housing 16, as shown in FIG. 9. This groove 70 receives the lip 23 of the receptacle 12 so that the housing 16 fits securely on the receptacle when the machine is in operation. The groove is partly open, as seen in FIG. 9, to facilitate cleaning thereof. To cover the remainder of the receptacle's open mouth, an additional cover portion 72 is provided. This additional cover portion 72 also has a groove 74 formed along its periphery which receives the receptacle lip 23. This additional cover portion 72 can be selectively removed while the dasher 30 is mixing the contents of the pan 12, so that a user can conveniently check on the consistency of the ice cream mixture without having to stop and open the machine.

In one example of operating the machine 10 to make ice cream, the ingredients are mixed and then cooled, preferably in the metal receptacle pan 12, for a period of time of up to about 2 hours (typically 1-2 hours) in the freezer compartment of a refrigerator, until the mixture has slush-like consistency. The sides and bottom of the pan 12 are then preferably scraped free of frozen mixture that may have stuck to them, and the housing 16, with the dasher 14 attached, is placed on top of the receptacle pan 12 such that the lip 23 of the pan fits within the groove 70. The machine is put back into the freezer, and the switch 56 is closed to actuate the electrical power circuit to rotate the dasher. The mixture is stirred by the dasher for about 30 minutes and preferably for about 20-25 minutes. The dasher causes the mixture to undulate slowly upwardly and circumferentially and around the fixed posts 20, 21 which break up any lumps that may form. The switch is then turned "off" and the receptacle containing the ice cream is left within the freezer until it has frozen to the desired hardness, a period of about 1-3 hours. The following is a suitable recipe for making vanilla ice cream with the ice cream machine 10 of the present invention:

VANILLA ICE CREAM

Put ⅓ CUP OF EVAPORATED MILK in a double boiler and scald. Add ¾ CUP OF SUGAR and 1 TABLESPOON OF GELATIN softened in ⅓ CUP OF WATER. Cook and stir thoroughly 3 or 4 minutes until the spoon is lightly coated. Place the pan in cold water until the mixture is completely cooled. Whip 2½ CUPS OF HEAVY CREAM to a custard-like consistency and stir into the cooled mixture. Add 2 TEASPOONS OF VANILLA EXTRACT and mix thoroughly. Pour into the METAL PAN. Freeze 1 hour and 30 minutes. Run a spoon around the sides and bottom of the metal pan to loosen frozen mixture, and break up large lumps. Mix for 20 minutes in the freezer. Cover metal pan with plastic base and leave in the freezer 1-3 hours, until the ice cream has desired hardness.

Thus, the present invention provides an ice cream machine which is simple in operation and which operates in the freezer conpartment of a common household refrigerator. It produces high quality ice cream within a reasonably short period of time using an internal low voltage power supply. The necessity of an external power supply in which an electrical cord extends through the freezer door to an outlet is eliminated.

I claim:

1. An ice cream machine comprising:
    an open top receptacle having a substantially horizontal bottom and an upwardly extending sidewall and suitable for containing ingredients for making ice cream; and
    a housing releasably mounted at a fixed position with respect to the receptacle and disposed over the receptacle and comprising:
    a dasher having a shaft extending downwardly into the receptacle to a level above the bottom thereof and rotatably mounted in the housing to rotate about a substantially vertical axis, said dasher further having a elongated substantially horizontally extending blade affixed to the bottom end only of the shaft and being spaced from and out of contact with the bottom and sidewall of the receptacle, said blade being adapted to stir said ingredients when rotating about said axis, said shaft being centered with respect to the receptacle;
    at least one substantially vertical post fixedly mounted to the housing eccentrically of the shaft and extending downwardly into the receptacle only to a level above the the blade; and
    a power unit mounted within the housing and means mounted within the housing for transmitting power from the power unit to the dasher shaft to cause rotation of the dasher about said axis, said dasher thereby rotating with respect to the receptacle and the post to stir the ice cream ingredients wherein said dasher blade has a major surface extending along a plane slightly inclined with respect to the bottom of the receptacle.

2. An ice cream machine according to claim 1 wherein the acute angle between said major surface of the blade and the bottom of the receptacle is about 10°.

3. An ice cream machine according to claim 1 wherein the post is T-shaped in horizontal cross section, with the top bar of the T being substantially in a plane including said axis of rotation of the dasher.

4. An ice cream machine according to claim 1 wherein the dasher is spaced a distance of about 1/16 to ⅛ inch from both the sidewall and the bottom of the receptacle.

5. An ice cream machine according to claim 1 wherein the dasher is rotated with respect to the receptacle and the post at less than about 5 r.p.m.

6. An ice cream machine according to claim 1 wherein the means for rotating the dasher include an electric motor and a battery power source for operating the motor.

7. An ice cream machine according to claim 1 wherein the dasher comprises: a flange extending from a laterally outer end of the blade along a substantially vertical plane which is at an acute angle with respect to the sidewall of the receptacle; and at least one lug extending downwardly from a portion of the blade which is between the shaft and the flange, the lug having a major surface which is in a plane that is at substantially the same acute angle with respect to the sidewall of the receptacle as the flange.

8. An ice cream machine according to claim 7 wherein the blade has a laterally extending major surface which is disposed at an acute angle with respect to the bottom of the receptacle.

9. An ice cream machine according to claim 8 wherein the acute angle between said major surface of the blade and the receptacle bottom is about 10°.

10. An ice cream machine according to claim 7 wherein the acute angle between either the flange or the lug and the sidewall of the receptacle is about 24°.

11. An ice cream machine according to claim 7 wherein the lug and the flange are dimensioned and arranged to describe concentric annuli spaced from each other upon rotation of the dasher.

* * * * *

UNITED STATES PATENT AND TRADEMARK OFFICE
CERTIFICATE OF CORRECTION

PATENT NO. : 3,985,347
DATED : October 12, 1976
INVENTOR(S) : John S. Doyel

It is certified that error appears in the above-identified patent and that said Letters Patent are hereby corrected as shown below:

Column 2, line 42, delete "mixedand", and insert -- mixed and --.

Column 5, line 18, delete "solid", and insert -- sold --.

Column 6, line 52, delete "a", and insert -- an --.

Column 6, line 63, delete "the", first occurrence.

Column 6, line 63, after "the", insert -- top of --.

Signed and Sealed this

Twenty-ninth Day of March 1977

[SEAL]

Attest:

RUTH C. MASON
*Attesting Officer*

C. MARSHALL DANN
*Commissioner of Patents and Trademarks*